(12) United States Patent
DiGiorgio

(10) Patent No.: US 12,307,916 B2
(45) Date of Patent: May 20, 2025

(54) VIRTUAL CERTIFICATE TRAINING AND EVALUATION SYSTEM USING HANDS-ON EXERCISES

(71) Applicant: Silverback Consulting Group LLC, Hasbrouck Heights, NJ (US)

(72) Inventor: Michael DiGiorgio, Hasbrouck Heights, NJ (US)

(*) Notice: Subject to any disclaimer, the term of this patent is extended or adjusted under 35 U.S.C. 154(b) by 363 days.

(21) Appl. No.: 16/896,484

(22) Filed: Jun. 9, 2020

(65) Prior Publication Data
US 2021/0383716 A1    Dec. 9, 2021

(51) Int. Cl.
G09B 19/00    (2006.01)
G06F 16/93    (2019.01)
(Continued)

(52) U.S. Cl.
CPC ............. *G09B 19/00* (2013.01); *G06F 16/93* (2019.01); *G06Q 10/10* (2013.01); *G06Q 50/01* (2013.01);
(Continued)

(58) Field of Classification Search
CPC ........... G09B 19/00; G09B 7/00; G06F 16/93; G06Q 10/10; G06Q 50/01; G06Q 50/205; H04L 12/1813; H04N 7/15; H04N 7/01
See application file for complete search history.

(56) References Cited

U.S. PATENT DOCUMENTS

| 10,147,338 B2 | 12/2018 | Trumbull et al. |
| 2007/0259324 A1* | 11/2007 | Frank .................. G09B 5/14 434/322 |

(Continued)

FOREIGN PATENT DOCUMENTS

| CN | 10461658 | 5/2015 |
| WO | 2011057503 | 5/2011 |
| WO | WO-2018175675 A1 * | 9/2018 |

*Primary Examiner* — Sherrod L Keaton
(74) *Attorney, Agent, or Firm* — OMNIVAULT LLC; Robert Demis

(57) ABSTRACT

A system and method for providing virtual and distance education using hands-on exercises, and more specifically, to a system and method for providing remote virtual training and skill demonstration evaluation are disclosed. The system includes an instructor computing system and one or more student computing systems. The instructor computing system include a course material processor for generating course material for presentation to student computing systems, an instructor document transmitter/receiver for exchanging educational documents with each of one or more student computing systems, an instructor camera coupled to a camera interface for capturing a live video stream transmitted to each of the one or more student computing systems for viewing presentations and course material, and an instructor message processor for exchanging live and interactive messages with each of the one or more student computing systems. Each one of the one or more student computing systems include a student document transmitter/receiver for exchanging educational documents with the instructor computing systems, a student message processor for exchanging interactive messages with each of the other one or more student computing systems and the instructor computing system, a student camera coupled to a camera interface for capturing a live video stream transmitted to the instructor computing system and to each of the one or more student computing systems for viewing questions, comments and feedback, and a student audio-video interface for receiving streaming video data and course material from the instructor computing system and displaying for live viewing. The student computing systems provide streaming video of skill demonstrations and hands-on exercises of each of the one or more students demonstrating comprehension of presented course material.

6 Claims, 8 Drawing Sheets

(51) Int. Cl.
*G06Q 10/10* (2023.01)
*G06Q 50/00* (2012.01)
*G06Q 50/20* (2012.01)
*G09B 7/00* (2006.01)
*H04L 12/18* (2006.01)
*H04N 7/15* (2006.01)

(52) U.S. Cl.
CPC ............. *G06Q 50/205* (2013.01); *G09B 7/00* (2013.01); *H04L 12/1813* (2013.01); *H04N 7/15* (2013.01)

(56) References Cited

U.S. PATENT DOCUMENTS

| | | | |
|---|---|---|---|
| 2008/0133964 A1* | 6/2008 | Rogers | G06F 11/2294 714/E11.113 |
| 2014/0322682 A1* | 10/2014 | Baym | G09B 5/02 340/5.6 |
| 2017/0345334 A1* | 11/2017 | DiGiorgio | G09B 5/065 |
| 2019/0304188 A1 | 10/2019 | Bridgeman et al. | |
| 2021/0264810 A1* | 8/2021 | Johnson | G09B 9/00 |

* cited by examiner

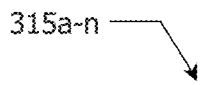

| | |
|---|---|
| Section 1 | Perform and Verify Vehicle Inspections, and Verify Product Identification and Documentation Requirements |
| Task 1 | Perform a Post-Trip Inspection |
| Task 2 | Pre-Inspect the Vehicle for Safe Operation |
| Task 3 | Verify Annual/Periodic Vehicle Inspections, Product Identification, and Documentation Requirements |
| Section 2 | Identify Procedures for the Safe Handling of Hazardous Materials and Verify the Presence of Propane Odorant |
| Task 1 | Identify Procedures for the Safe Handling of Hazardous Materials |
| Task 2 | Verify the Presence of Propane Odorant |
| Section 3 | Identify Procedures for Interruption of Service and Out of Gas Calls, Perform a Leak Check, and Restore Service to an Appliance |
| Task 1 | Identify Procedures for Interruption of Service and Out of Gas Calls |
| Task 2 | Perform a Leak Check |
| Task 3 | Restore Service to an Appliance |
| Section 4 | Maintain Control of Vehicles, Handle Accidents and Emergencies, and Identify Vehicle Security Requirements |
| Task 1 | Identify Measures for Maintaining Control of a Vehicle |
| Task 2 | Identify Safe Delivery Routing Practices and Procedures |
| Task 3 | Identify Methods for Handling Accidents and Emergencies |
| Task 4 | Identify Vehicle Parking, Servicing, and Security Requirements |
| Section 5 | Identify Bobtail Equipment and Systems, Load a Bobtail, and Perform Bobtail Inspections |
| Task 1 | Identify Bobtail Equipment and Systems |
| Task 2 | Load a Bobtail |
| Task 3 | Perform Walk Around and Pre-Transfer Inspections on a Bobtail |
| Task 4 | Perform Monthly Inspections and a Meter Creep Test on a Bobtail |
| Section 6 | Fill a Storage Container at a Customer Location |
| Task 1 | Inspect Customer Containers and Installations Prior to Filling |
| Task 2 | Fill Propane Storage Containers at Customer Locations |
| Section 7 | Inject Methanol and Evacuate Containers |
| Task 1 | Inject Methanol into a Container |
| Task 2 | Evacuate an ASME Tank Using a Portable Compressor or a Bobtail Pump |

NOTICE: The Skills Evaluator must be the Candidate's supervisor or another qualified person who has completed CETP 2.2 "*Bobtail Delivery Operations*" or is familiar with the subject matter.

FIG. 2b

VIRTUAL CERTIFICATE TRAINING AND EVALUATION SYSTEM USING HANDS-ON EXERCISES

TECHNICAL FIELD

This application relates in general to a system and method for providing virtual and distance education using hands-on exercises, and more specifically, to a system and method for providing remote virtual training and skill demonstration evaluation.

BACKGROUND

As more employees around the world navigate change in remote workplaces, leaders in virtual education will continue to grow as they support workforce education remotely. Instructors have been using the virtual classroom for years. Various video-based communication products have allowed the presentation of materials to be performed remotely. As these instructors continue to educate various industries, typically ones requiring employee certification for safety, environmental, and technology skills, the instructors must ensure business continuity in times of unprecedented change in the way education is provided. What began as a simple virtual Power Point teaching platform now requires much more in both content as well as evaluation of knowledge and skills required for these certifications. Existing teaching systems may present material to remote students and provide for written testing; these evaluations, however, do not actually measure the employees ability to utilize the new knowledge and skills in real world situations. This hands-on, real-time skill evaluation and demonstration is lacking in existing remote virtual training systems.

Therefore, a need exists for a system to provide remote education using hands-on exercises to students that concludes with an evaluation of the knowledge obtained from the training as well as a demonstration and evaluation of the skills acquired from the training. This skill demonstration and evaluation is especially critical in the case of mandated certifications to ensure that employees actually can use the training in their day-to-day activities. This system may also benefit remote training in many other situations as well. The system disclosed in regards to the present invention attempts to address some of the limitations and inadequacies of existing remote training.

SUMMARY

In accordance with the present invention, the above and other problems are solved by providing a system and method for remote virtual training and skill demonstration evaluation according to the principles and example embodiments disclosed herein.

In one embodiment, the present invention is a system for providing remote virtual training and skill demonstration evaluation. The system for providing virtual and distance education using hands-on exercises, and more specifically, to a system and method for providing remote virtual training and skill demonstration evaluation are disclosed. The system includes an instructor computing system and one or more student computing systems. The instructor computing system include a course material processor for generating course material for presentation to student computing systems, an instructor document transmitter/receiver for exchanging educational documents with each of one or more student computing systems, an instructor camera coupled to a camera interface for capturing a live video stream transmitted to each of the one or more student computing systems for viewing presentations and course material, and an instructor message processor for exchanging live and interactive messages with each of the one or more student computing systems. Each one of the one or more student computing systems include a student document transmitter/receiver for exchanging educational documents with the instructor computing systems, a student message processor for exchanging interactive messages with each of the other one or more student computing systems and the instructor computing system, a student camera coupled to a camera interface for capturing a live video stream transmitted to the instructor computing system and to each of the one or more student computing systems for viewing questions, comments and feedback, and a student audio-video interface for receiving streaming video data and course material from the instructor computing system and displaying for live viewing. The student computing systems provide streaming video of skill demonstrations and hands-on exercises of each of the one or more students demonstrating comprehension of presented course material.

In another embodiment, the present invention is a method for providing remote virtual training and skill demonstration evaluation. The method connects an instructor computing system to one or more student computing systems over the Internet, presents course material to student computer system in an interactive session using streaming video, receives and responds to student questions and feedback during the interactive session using streaming video, provides a written examination to each of the one or more student computing systems to evaluate comprehension of presented course material, receives individual written examination answers in response to the written examination, when one or more of the students pass the written exam, receives each of these students with an interactive skills demonstration and completion of hands-on exercises, when each of the one or more students successfully complete the interactive skills demonstration and the hands-on exercises, awarding a certification of completion of the course material.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout:

FIG. 2a-c illustrate another example embodiment of a system for providing remote virtual training and skill evaluation according to the present invention.

DETAILED DESCRIPTION

Figure 1A:
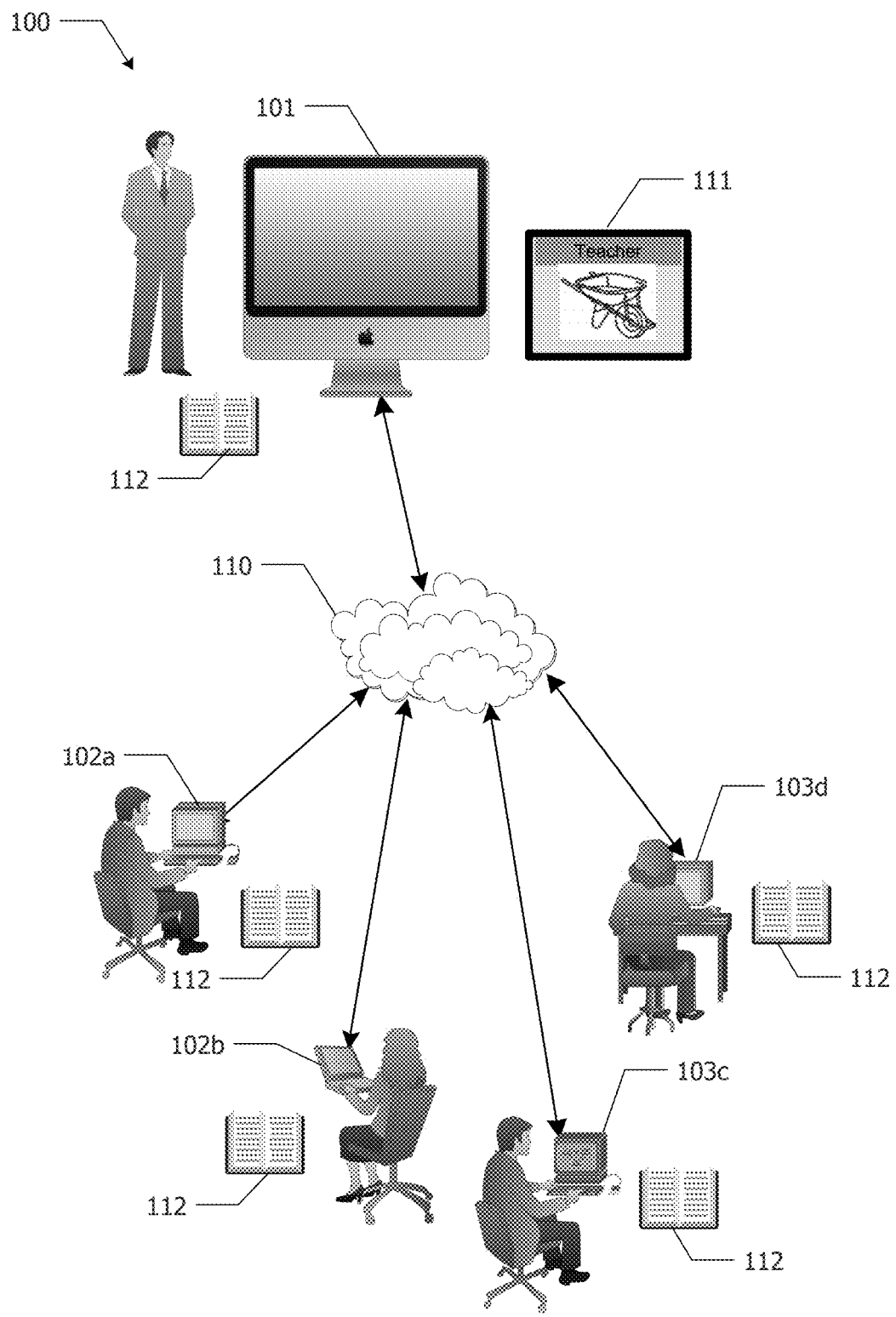
FIGS. 1a-b illustrate an example embodiment for a system that provides remote virtual training and skill demonstration evaluation according to the present invention.

This application relates in general relates to a system and method for providing virtual and distance education using hands-on exercises, and more specifically, to a system and method for providing remote virtual training and skill demonstration evaluation.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The term "mobile application" refers to an application executing on a mobile device such as a smartphone, tablet, and/or web browser on any computing device.

The terms "student," "client," and "user" refer to an entity, e.g. a human, using the Virtual Certificate Training and Evaluation System including any software or smart device application(s) associated with the invention. The term user herein refers to one or more users.

The term "connection" refers to connecting any component as defined below by any means, including but not limited to, a wired connection(s) using any type of wire or cable for example, including but not limited to, coaxial cable(s), fiberoptic cable(s), and ethernet cable(s) or to wireless connection(s) using any type of frequency/frequencies or radio wave(s). Some examples are included below in this application.

The term "invention" or "present invention" refers to the invention being applied for via the patent application with the title "Virtual Certificate Training and Evaluation System Using Hands-On Exercises." Invention may be used interchangeably with training.

Figure 1B:
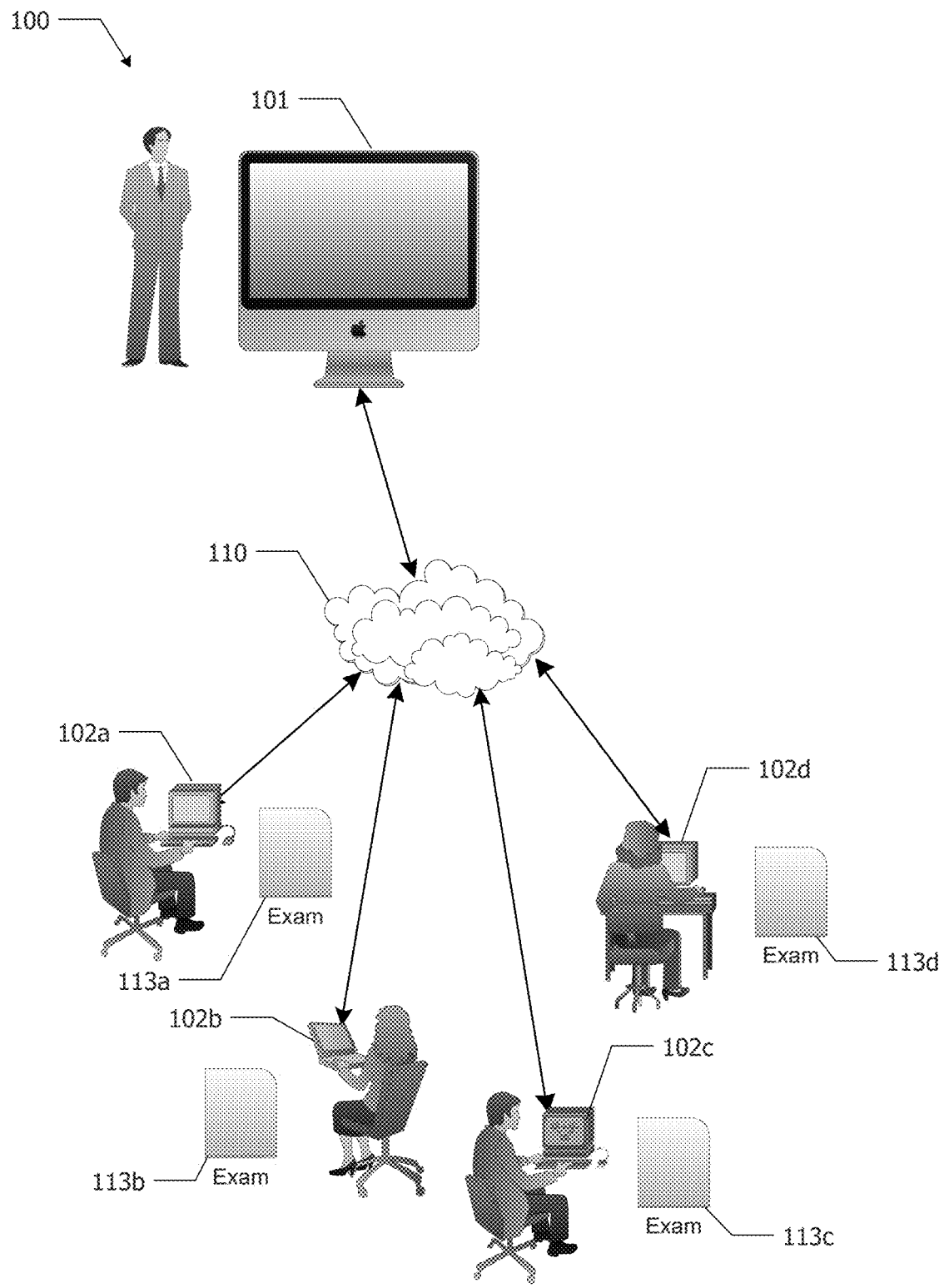

In general, the present disclosure relates to a system and method for providing remote virtual education and skill evaluation and demonstration. To better understand the present invention, FIGS. 1a-b illustrate an example embodiment for a system that provides remote virtual training and skill demonstration evaluation according to the present invention. Virtual training, often referred to as remote training or distance learning, utilizes computer network technology to permit an instructor's computer 101 to share content to be taught to a plurality of students' computers 102a-d over the Internet 110 as shown in FIG. 1a. Web cameras built into many computing systems allow an instructor to appear present in the virtual classroom 100 when the instructor and students may be located across a large geographic area.

Successful ways of teaching, as defined by certification examinations resulting in at minimum a 95% pass rate for students taking state or industry administered certification exams, have been found to include a teaching style of preparing students in virtual study groups. These study groups may begin with the instructor and all of the students having access to a textbook 112 containing the required information. This textbook 112 may be a physical book as well an eBook on their computers 101, 102a-b. This instruction may be done live or virtually, whereas most current instructors and remote training provide students homework to prepare for the final exam.

These study groups may use demonstrations on exactly the material being taught. For example, instead of using a hand truck in an example, an instructor may use a wheelbarrow commonly referred to as a wheel barrel. Virtually, the instructor explains the difference: A wheelbarrow is a small hand-propelled vehicle, usually with just one wheel, designed to be pushed and guided by a single person using two handles at the rear, or by a sail to push the ancient wheelbarrow by wind. The term "wheelbarrow" is made of two words: "wheel" and "barrow." "Barrow" is a derivation of the Old English "bearwe" which was a device used for carrying loads. In order to ensure the students are obtaining the intended knowledge and skills, the present invention has the students demonstrate use of a wheelbarrow and interactively engage with the instructor to ensure the student may demonstrate obtaining the desired skills.

The wheelbarrow is designed to distribute the weight of its load between the wheel and the operator, so enabling the convenient carriage of heavier and bulkier loads than would be possible if the weight was carried entirely by the operator. As such it is a second-class lever. Traditional Chinese wheelbarrows, however, had a central wheel supporting the whole load. Use of wheelbarrows is common in the construction industry and in gardening.

The word also sometimes applies to two-wheeled versions. The word has nothing to do with barrels; however, the notion of a "wheelbarrel" almost makes sense. If you take a barrel, or a big oil drum, for example, and cut it in half from top to bottom, then take one half and mount it onto a frame with handles on one end and a big wheel on the other, you essentially have created the very thing that would be a "wheel barrel." The only trouble is there is no such thing as a "wheel barrel."

The instructor may also demonstrate the different types that are available together with a diagram and breakdown of the equipment. The instructor may add humor, and other presentation elements, to each and every class to acquire and hold students' attention. The instructor may follow up any discussion or presentation by showing a video in the instructor's computer 101 demonstrating exactly how the piece of equipment actually works. This video is shared with the students on their computers 103a-d using this system. The particular video shown to each class may be any number of different technical topics that vary from class to class as well as session to session within a class. An example of such a video demonstration may be found at the URL: https://www.youtube.com/watch?v=bqzu1_NqK_Y.

Upon completion of any instruction and demonstration of the content of the class, the instructor may perform a written evaluation of the knowledge gained by the students as shown in FIG. 1b. An instructor may send a document containing an examination 113a-d to the students for completion. The students complete the exam and return it to the instructor upon completion. In alternate embodiments, the test questions may be presented to the students using their computers 103a-d. The questions are presented on the computer 103a-d display and the students enter their answers into the computer. The completed answers may then be sent to the instructor's computer 101 in lieu of an electronic document.

In one embodiment, Virtual exams may be graded immediately by computer informing the students instantly if they passed or failed. Administering exams virtually is done by a certified proctor who must pass a certified exam to become a proctor. Following this, the proctor must retest every two years. Proctors must remain in the virtual training room with students during all testing.

Figure 2A:
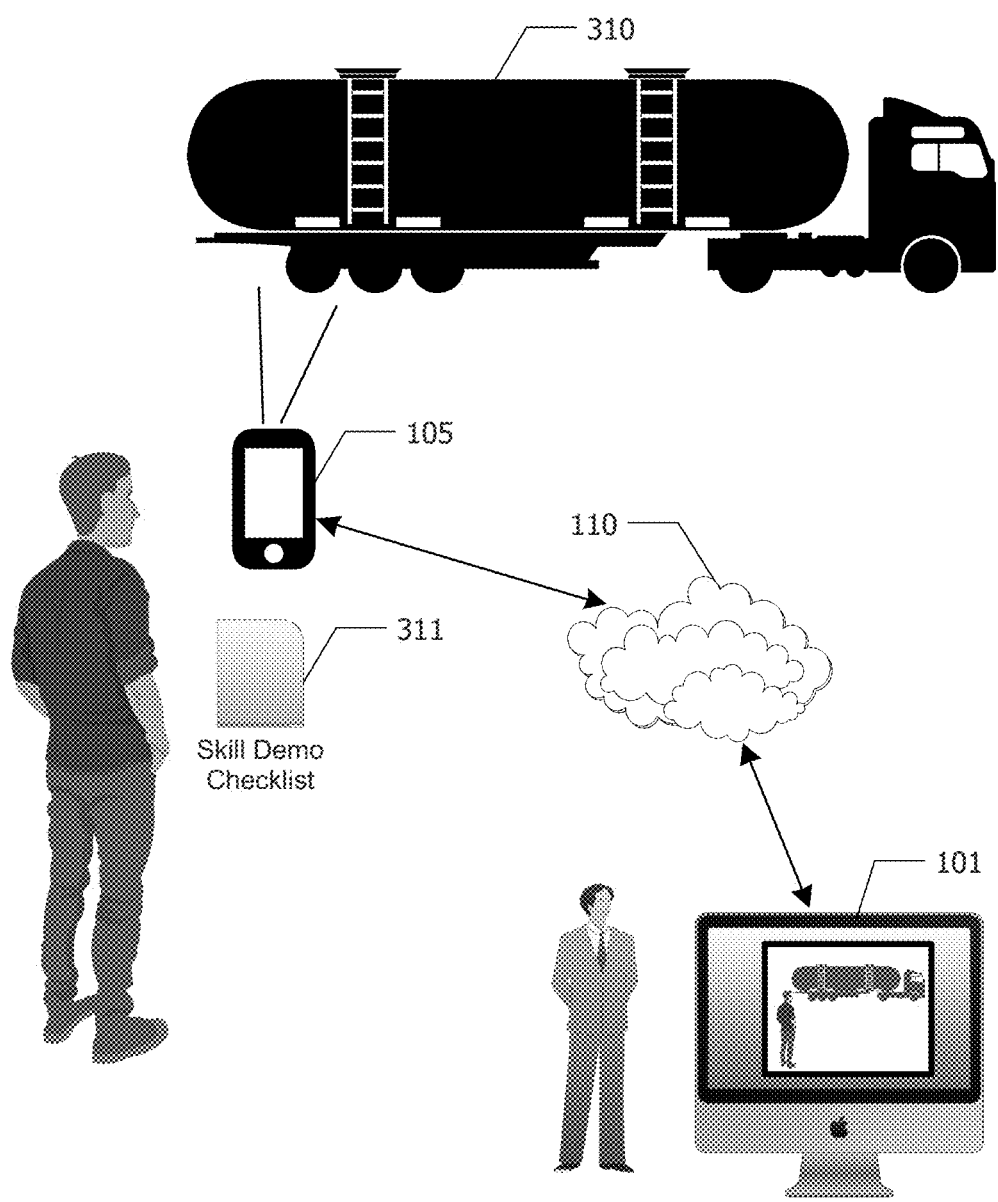

FIG. 2a-b illustrate another example embodiment of a system for providing remote virtual training and skill evaluation according to the present invention. Upon completion of the classroom training and written testing, the virtual classroom 100 physically moves outside where the students demonstrate to the instructor both LIVE and Virtually that they know how to use the Wheel Barrel, OOPS, Wheelbarrow as previously taught. This part of the virtual training is called the virtual skill evaluation, a component currently missing from existing virtual classes. Students demonstrate to the instructor in real-time that they know how to perform the functions that they were taught in class.

This demonstration is performed virtually by the students using a smartphone 105 to permit the instructor to "see" the students perform their demonstration. The virtual training system may include providing each student with a checklist of skills 311 to be demonstrated as part of the virtual skill evaluation. As the students participate in the skill evaluation using hands-one exercises, they each explain to the instructor exactly what they are doing. The demonstration may be both live and interactive in that the student provides a live video stream from a smartphone 105 to the instructor's computer 101 so the instructor may view and critique.

In FIG. 2a, a skill evaluation is shown for training conducted for drivers of a propane truck 310. After two full days of classroom study, the student has to demonstrate to a registered skills evaluator that they know how to do the work. Using a checklist, a partial example of which is shown in FIG. 2b, the student performs each of the required tasks 315a-n while streaming the demonstration to the instructor's computer 101 using the camera in the smartphone 105.

The same process of using the instructor's computer 101 to show all of the students the material in the virtual classroom, the streaming video, and any interaction between each student and the instructor during the demonstration, may be shown on all of the students' computers 102a-d as well as the instructor's computer 101. Other students may learn from watching other student's demonstrations just as was once done in classrooms where students went to the front of the room to present a project.

Figure 2C:
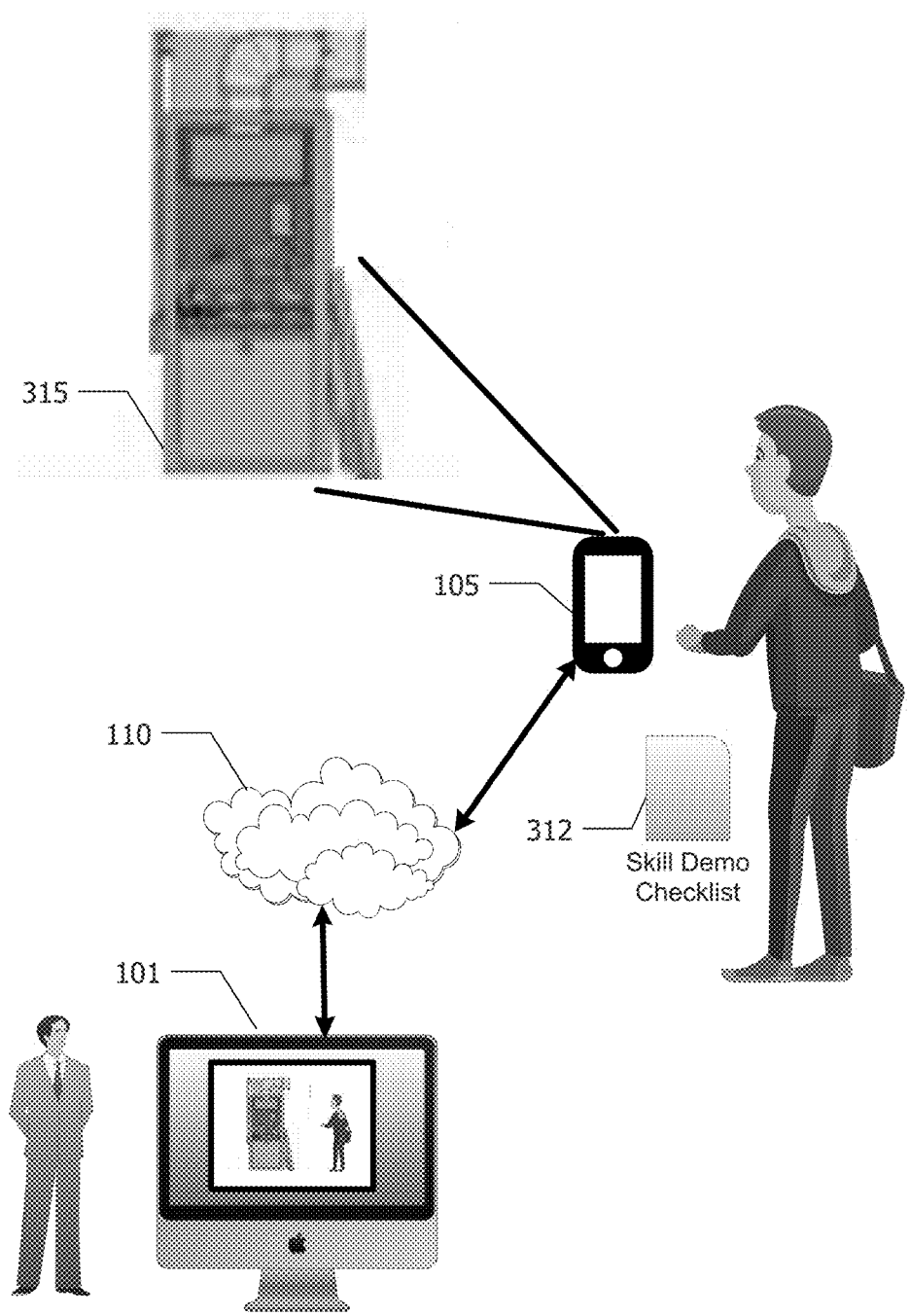

This virtual training and skill evaluation process may be used for a wide variety of technical disciplines. For example, one appliance electricity course is nearly 500 pages of intense electrical information directly related to any and all natural gas and propane gas appliances. FIG. 2c shows a student demonstrating skills on an actual appliance, such as a furnace, from a similar skills checklist 312 while the instructor watches and interacts using a computer 101.

Figure 3:
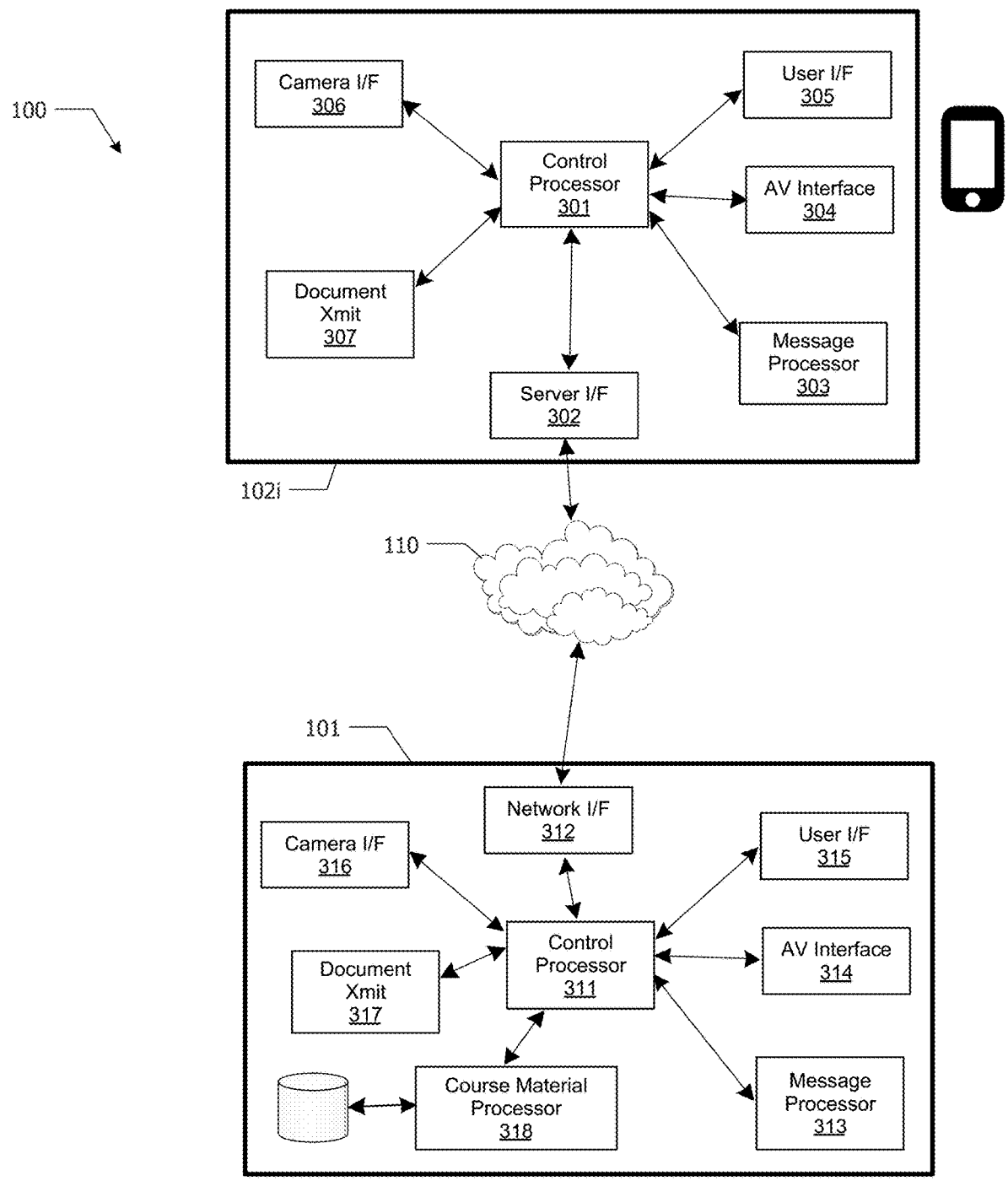
FIG. 3 illustrates a computing system of software components providing remote virtual training and skill demonstration evaluation according to the present invention.

FIG. 3 illustrates a computing system of software components providing remote virtual training and skill demonstration evaluation according to the present invention. The software components of FIG. 3 constitute the software functionality utilized by the instructor's computer 101 and the students' computers 120a-d and smartphones 105 as part of the virtual training and evaluation system 100. These components may be an integrated software application executing on each of these devices or may be a set of applications working together to provide the virtual classroom, testing, and demonstration suite. The software components for the students may be the same set of components on both the computers 102a-d and the smartphone 105. The instructor's computer 101 also requires additional components to perform its tasks. The students' computers 102i include a control processor 301, a computer interface 302, a message processor 303, and AV interface 304, a user interface 305, a camera interface 306, and a document transmitter/receiver 307. The instructor's computer 101 includes a control processor 311, a computer interface 312, a message processor 313, an AV interface 314, a user interface 315, a camera interface 316, a document transmitter/receiver 317, course material processor 318, and a data store 319.

Within a student computer 102i, the control processor 302 performs all of the logical operations needed to receive streaming data from an instructor computer 101, obtain and transmit video and audio of the student for viewing by all in the class, receive and upload data and files used for examination and demonstrations, communicate with the user, and display images as instructed. In a typical embodiment, this control processor may be an embedded programmable processing device that executes firmware stored within local memory.

The computer interface 302 provides a mechanism for a student computer 102i to communicate with remote devices over the Internet 110. This network interface 302 also uses the supported hardware and corresponding software application program interfaces [APIs] to provide the network communications needed to interact with remote devices such as an instructor computer 101.

The message processor 303 provides a mechanism for the student to send and receive messages of several types with other students and the instructor. These messages may include emails that may be written and read outside of the virtual classroom activities, group chat that provides live interactive message communications during a virtual class session with all students and the instructor, and text messages to a class recipient such as the instructor or class member.

The AV interface 304 provides the ability for streaming video and corresponding audio received over the Internet 110 from other class members' computers 102a-d and the instructor's computer 101. The interface also accepts input video from camera interface 306 and audio from a locally attached microphone to generate a video data stream for transmission to other class members' computers 102a-d and the instructor's computer 101.

The user interface 305 uses the touch screen or display of the smartphone 105 and keyboard and mouse of the student computer 102a-d to provide the user with a mechanism to control the student training application. The user interface 124 displays information for the user to view on the touch screen or display. The user interface 124 also accepts input commands from the user that initiate operations to be performed by the student training application. The user interface 105a uses the supported hardware and corresponding software APIs to provide the interface for the user to interact with the student training application.

The camera interface 306 connects an internal camera of the computing devices 102a-d and smartphone 105 to the other components of the student training application. The interface may generate still images and video data for use as needed by the student training application.

The document transmitter/receiver 307 provides a secure and authenticated way for the students to receive documents and examination/demonstration documents from the instructor's computer 101 for use by the student. The document transmitter/receiver 307 also provides a secure and authenticated way for the students to upload documents to the instructor's computer 101. The sending and receiving computers recognize and authenticate communicating devices to ensure the students and the instructor are receiving the material from a known source.

The instructor's computer 101 includes the control processor 311, the computer interface 312, the message processor 313, the AV interface 314, the user interface 315, the camera interface 316, and the document transmitter/receiver 317, similar to the corresponding components in the students' computers 102i. All of these functions perform the corresponding functions described above.

The course material processor 318 retrieves course-related material from the data store 319 for transmitting the material to the students' computers 102a-d. This material may include images, presentation slides, and video files used by the instructor when teaching a class. The course processor 318 may also obtain course material from data sources available on the Internet 110. For example, the instructor may play video data from YouTube™ or similar sources that are then shared with the students' computers 102a-d rather than downloading a copy of the video file and storing it on the local data store 319 to be used during the course. All examination materials, demonstration checklists, and related course materials to be shared by the instructor to students are maintained and provided by the course material processor 318.

Figure 4:
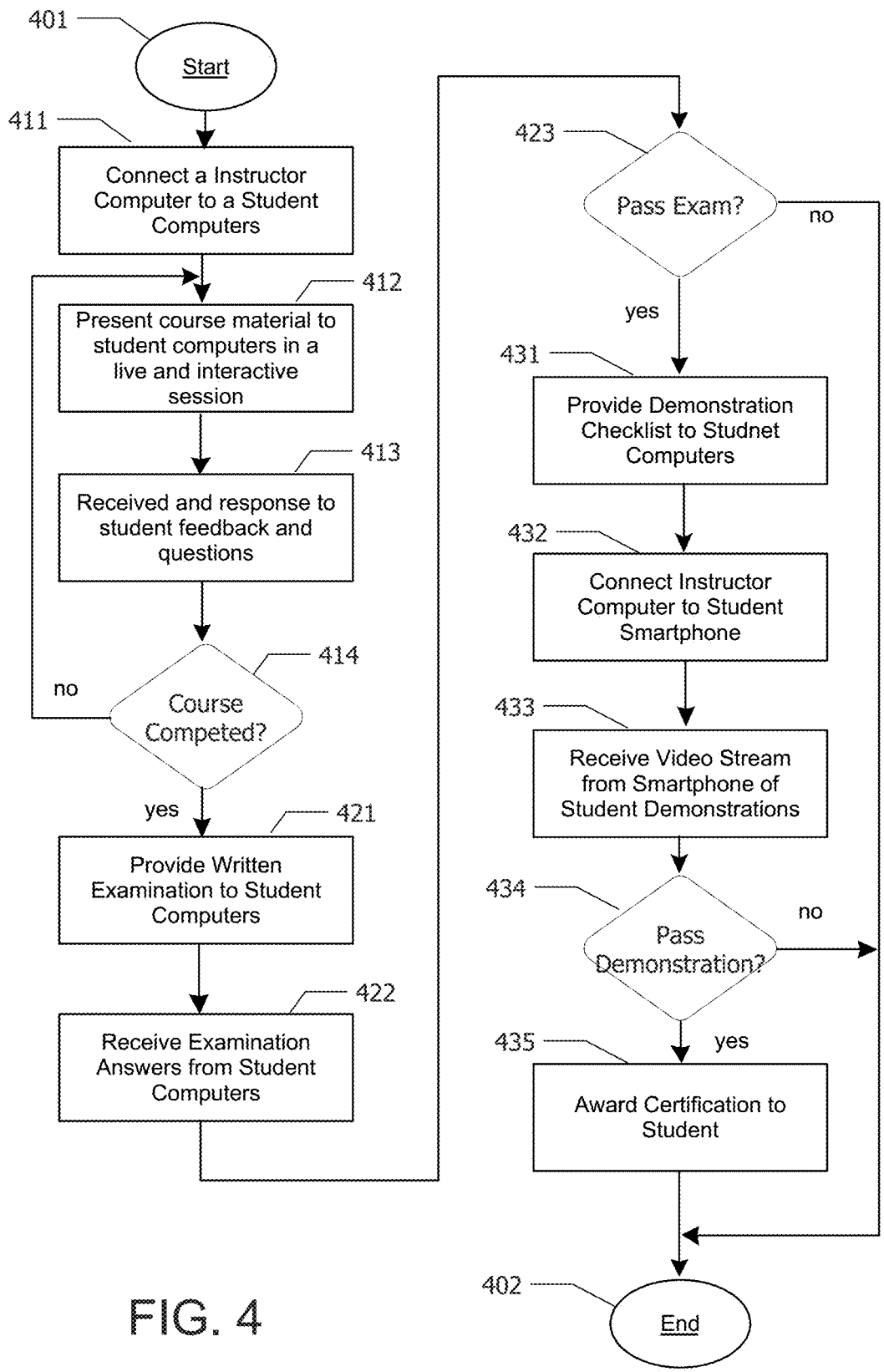
FIG. 4 illustrates a flowchart corresponding to a method performed by software components providing remote virtual training and skill demonstration evaluation according to the present invention.

FIG. 4 illustrates a flowchart corresponding to a method performed by software components providing remote virtual training and skill demonstration evaluation according to the present invention. The process 400 begins 401 as the instructor's computer 101 connects to a plurality of student computers 102a-d in step 411 to create the virtual classroom. In step 412, the instructor presents the course material to the students in the form of sharing a computer screen, playing video files, sharing images and documents, and providing demonstrations of physical items using a web cam.

The instructor receives and responds to student's questions and comments in step 413 via streaming video and audio from the students' computers 102a-d to the instructor's computer 101. Test step 414 checks to see if the course material has been completed, and if not, returns to step 412 to continue presenting course material.

When test step 414 determines that all of the course material has been completed, step 421 provides any written examination materials and receives the students answers in step 422. Test step 423 determines whether or not a student passes or fails the written examination, and if the student fails, the process ends 403.

When test step 423 determines that a student has passed the written examination, step 431 provides a demonstration checklist and any supporting material to the student's computer 102a-d. At the scheduled time, the instructor's computer 101 connects with the student's smartphone 105 in step 432. The instructor, in step 433 receives the video stream and related audio data from the student's smartphone 105 while performing any required demonstrations. The student's smartphone 105 receives at least a return audio stream from the instructor's computer 101 to allow the instructor to interactively guide and critique the student demonstration as it occurs.

One the demonstration is complete, test step 434 determines whether the student has passed the demonstration of taught skills, and if not, the process once again ends 402. When test step 434 determines that the student has passed the demonstration portion, and thus has successfully completed the certification process, the instructor may award the student with the required certification in step 435 and the process may end 402.

Figure 5:
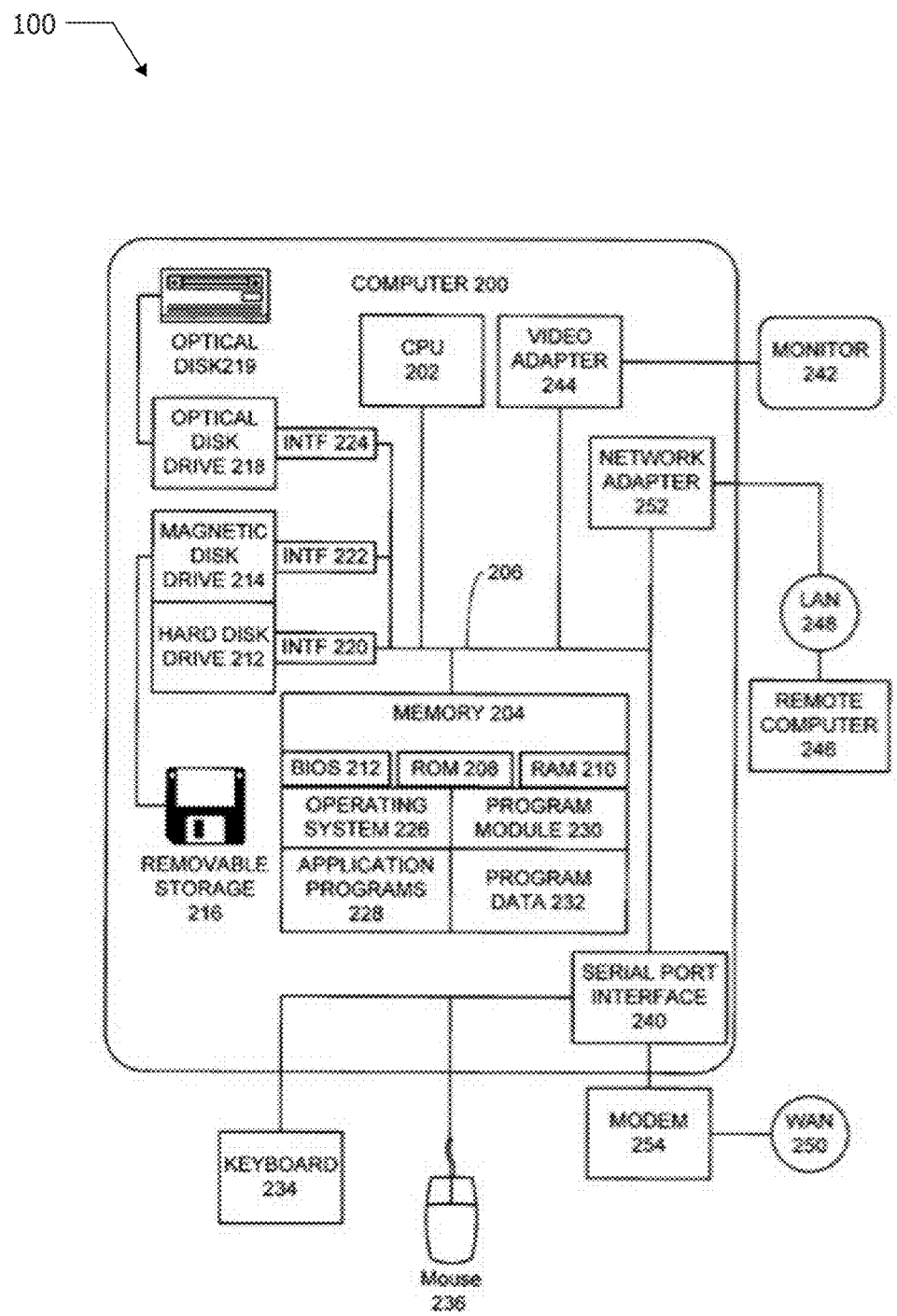
FIG. 5 illustrates a generalized schematic of a programmable processing system utilized as the various computing components described herein used to implement an embodiment of the present invention.

FIG. 5 illustrates a generalized schematic of a programmable processing system utilized as the various computing components described herein used to implement an embodiment of the present invention. The central processing unit ("CPU") 202 is coupled to the system bus 204. The CPU 202 may be a general-purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 also may include random access memory (RAM) 208, which may be synchronous RAM (SRAM), dynamic RAM (DRAM), synchronous dynamic RAM (SDRAM), or the like. The computer system 200 may utilize RAM 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 may also include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software or web-based application on a display device 224, such as a monitor or touch screen.

The I/O adapter 210 may couple one or more storage devices 212, such as one or more of a hard drive, a solid-state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 208, which may be one or more of a LAN, WAN, and/or the Internet. The communications adapter 214 may also be adapted to couple the computer system 200 to other networks such as a global positioning system (GPS) or a Bluetooth network. The user interface adapter 216 couples user input devices, such as a keyboard 220, a pointing device 218, and/or a touch screen (not shown) to the computer system 200. The keyboard 220 may be an on-screen keyboard displayed on a touch panel. Additional devices (not shown) such as a camera, microphone, video camera, accelerometer, compass, and or gyroscope may be coupled to the user interface adapter 216. The display adapter 222 may be driven by the CPU 202 to control the display on the display device 224. Any of the devices 202-222 may be physical and/or logical.

The applications of the present disclosure are not limited to the architecture of the computer system 200. Rather the computer system 200 is provided as an example of one type of computing device that may be adapted to perform the functions of a system and method for providing remote virtual training and skill demonstration evaluation, including servers, personal computers, and mobile devices as shown in FIGS. 1-3. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements. Is preceding 0054 necessary for this app?

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

What is claimed:

1. A system for providing virtual and distance education using hands-on exercises, the system comprising:
   instructor computing system, the instructor computing system comprises;
   a course material processor for generating course material for presentation to student computing systems, wherein the course material comprises displaying pre-recorded videos, displaying images and presentation slides, and displaying live video stream of an instructor presenting physical examples,
   instructor document transmitter/receiver for exchanging educational documents with each of one or more student computing systems and one or more proctor computing systems;

an instructor camera coupled to a camera interface for capturing a live video stream: transmitted to each of the one or more student computing systems for viewing presentations and course material; and an instructor message processor for exchanging live and interactive messages with each of the one or more student computing systems; and the one or more student computing systems, each one of the one or more student computing systems comprise:

a student document transmitter/receiver for exchanging educational documents with the instructor computing systems;

a student message processor for exchanging interactive messages with each of the other one or more student computing systems and the instructor computing system;

a student camera coupled to a camera interface for capturing a live video stream transmitted to the instructor computing system and to each of the one or more student computing systems for viewing questions, comments and feedback; and a student audio-video interface for receiving streaming video data and course material from the instructor computing system and displaying for live viewing;

wherein the instructor computing system transmits a written examination evaluating comprehension of presented course material to at least one of the one or more proctor computing systems;

wherein the proctor computing system transmits the written examination to at least one of the one or more student computing systems, and monitors the at least one student computing system during completing of the course material examination;

wherein the proctor computing system transmits results corresponding to the written examination evaluating comprehension of presented course material to the instructor computing system upon completion of the course material examination;

wherein, only upon a determination that the results correspond to passing the written examination, the instructor computing system transmits a message to the at least one student computing system to demonstrate one or one or more skill demonstrations and hands-on exercises;

wherein the student computing systems provide streaming video of the one or more skill demonstrations and hands-on exercises of each of the one or more students demonstrating comprehension of presented course material; and wherein the course material processor of the instructor computing system generates a certification of completion upon completion of the course materials, an evaluation of comprehension of the presented course material, and successful demonstration of the one or one or more skill demonstrations and hands-on exercises.

2. The system according to claim 1, wherein the instructor computing system further comprises: an instructor audio-video interface for receiving streaming video data and feedback one or more student computing systems and displaying for live viewing; and a local datastore for maintaining the course material.

3. The system according to claim 1, wherein each of the one or more student computing systems further comprises:

a smartphone running a mobile application for capturing and transmitting live and virtual skill demonstration and hands-on exercises.

4. The system according to claim 1, wherein each of the student document transmitter/receiver exchanges documents, examination questions and answers, and written feedback with the instructor document transmitter/receiver.

5. The system according to claim 1, wherein the instructor message processor and each of the one or more student message processors exchange text messages, questions, and answers with one or more of the student message processors and the instructor message processor.

6. A system for providing virtual and distance education using hands-on exercises, the system comprising:

instructor computing system, the instructor computing system comprises:

a course material processor for generating course material for presentation to student computing systems, wherein the course material comprises displaying pre-recorded videos, displaying images and presentation slides, and displaying live video stream of an instructor presenting physical examples, an instructor document transmitter/receiver for exchanging educational documents with each of one or more student computing systems and one or more proctor computing systems;

an instructor camera coupled to a camera interface for capturing a live video stream transmitted to each of the one or more student computing systems for viewing presentations and course material;

and an instructor message processor for exchanging live and interactive messages with each of the one or more student computing systems;

an instructor audio-video interface for receiving streaming video data and feedback one or more student computing systems and displaying for live viewing; and a local datastore for maintaining the course material; and the one or more student computing systems, each one of the one or more student computing systems comprise:

a student document transmitter/receiver for exchanging educational documents with the instructor computing systems;

a student message processor for exchanging interactive messages with each of the other one or more student computing systems and the instructor computing system;

a student camera coupled to a camera interface for capturing a live video stream transmitted to the instructor computing system and to each of the one or more student computing systems for viewing questions, comments and feedback;

a smartphone running a mobile application for capturing and transmitting live and virtual skill demonstration and hands-on exercises; and a student audio-video interface for receiving streaming video data and course material from the instructor computing system and displaying for live viewing;

wherein the student computing systems provide streaming video of skill demonstrations and hands-on exercises of each of the one or more students demonstrating comprehension of presented course material;

wherein the course material comprises displaying pre recorded videos, displaying images and presentation slides, and displaying live video stream of an instructor presenting physical examples;

each of the student document transmitter/receiver exchanges documents, examination questions and answers, and written feedback with the instructor document transmitter/receiver;

wherein the instructor computing system transmits a written examination evaluating comprehension of presented course material to at least one of the one or more proctor computing systems;

wherein the proctor computing system transmits the written examination to at least one of the one or more student computing systems, and monitors the at least one student computing system during completing of the course material examination;

wherein the proctor computing system transmits results corresponding to the written examination evaluating comprehension of presented course material to the instructor computing system upon completion of the course material examination;

wherein, only upon a determination that the results correspond to passing the written examination, the instructor computing system transmits a message to the at least one student computing system to demonstrate one or one or more skill demonstrations and hands-on exercises, the instructor message processor and each of the one or more student message processors exchange text messages, questions, and answers with one or more of the student message processors and the instructor message processor;

wherein the course material processor of the instructor computing system generates a certification of completion upon completion of the course materials, an evaluation of comprehension of the presented course material, and successful demonstration of the one or one or more skill demonstrations and hands-on exercises.

* * * * *